United States Patent
Oh

(10) Patent No.: US 12,059,933 B2
(45) Date of Patent: Aug. 13, 2024

(54) APPARATUS AND METHOD FOR DETERMINING POSITION OF TIRE

(71) Applicants: Hyundai Motor Company, Seoul (KR); Kia Corporation, Seoul (KR)

(72) Inventor: Jung Hoon Oh, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 408 days.

(21) Appl. No.: 17/370,344

(22) Filed: Jul. 8, 2021

(65) Prior Publication Data

US 2022/0161612 A1    May 26, 2022

(30) Foreign Application Priority Data

Nov. 26, 2020   (KR) .................. 10-2020-0161690

(51) Int. Cl.
   *B60C 23/04*   (2006.01)

(52) U.S. Cl.
   CPC ...... *B60C 23/0416* (2013.01); *B60C 23/0486* (2013.01)

(58) Field of Classification Search
   None
   See application file for complete search history.

(56) References Cited

U.S. PATENT DOCUMENTS

| 7,574,293 B2 * | 8/2009 | Vredevoogd ....... B60C 23/0416 |
| | | 73/146 |
| 2004/0083034 A1 * | 4/2004 | Brillon ............... B60C 23/0416 |
| | | 701/1 |

* cited by examiner

Primary Examiner — James J Lee
Assistant Examiner — Jonathan E Reinert
(74) Attorney, Agent, or Firm — SLATER MATSIL, LLP

(57) ABSTRACT

An embodiment apparatus for determining a tire position includes a receiver configured to receive a signal from a tire pressure sensor, a processor configured to determine the tire position based on a tire internal temperature variation of a tire and a strength of the signal received from the tire pressure sensor, and a memory configured to store data and an algorithm executable by the processor.

19 Claims, 7 Drawing Sheets

APPARATUS AND METHOD FOR DETERMINING POSITION OF TIRE

CROSS-REFERENCE TO RELATED APPLICATIONS

This application claims the benefit of Korean Patent Application No. 10-2020-0161690, filed in the Korean Intellectual Property Office on Nov. 26, 2020, which application is hereby incorporated herein by reference.

TECHNICAL FIELD

The present disclosure relates to an apparatus and a method for determining a position of a tire.

BACKGROUND

In general, a vehicle wheel absorbs an impact from a road surface while supporting the load of a vehicle, transmits driving force and braking force to the road surface during the driving of the vehicle, and changes or maintains the direction of the vehicle.

Such a vehicle wheel includes a rim having a tire mounted on an outer circumference thereof and manufactured with stiffness sufficient to endure various types of external force and various types of impacts caused when the vehicle is driven or braked, and a tire to divide and support the load of the vehicle while rotating integrally with the rim and to provide driving force of the vehicle at the final stage.

In general, the tire of the vehicle may prevent a braking distance from being unnecessarily increased or fuel from being excessively consumed, in braking or driving, only when air pressure is properly maintained in driving. Accordingly, the air pressure of the tire is measured by using the tire pressure monitoring sensor (TPMS).

Regarding the tire pressure sensor, information, such as pressure or a temperature, is received from four tire pressure sensors mounted on wheels of the vehicle such that a tire low-pressure warning and air-pressure information of the wheels are displayed. In this case, to exactly determine the position (sensor position) of the tire pressure sensor, wheel pulse information may be received from wheel speed sensors of the wheels and the sensor position may be trained.

Accordingly, according to a conventional manner, when even one of four wheel speed sensors is failed, the sensor position may not be determined.

In addition, since wheel pulse information is received from four wheel speed sensors by using high-speed CAN communication of the vehicle, the training with the sensor position may be failed when the communication is instable.

SUMMARY

The present disclosure relates to an apparatus and a method for determining a position of a tire. Particular embodiments relate to a technology of determining a position of a tire, based on information of a tire pressure sensor (a tire pressuring monitoring sensor (TPMS)). Embodiments of the present disclosure can solve problems occurring in the prior art while advantages achieved by the prior art are maintained intact.

An embodiment of the present disclosure provides an apparatus for determining a tire position and a method for the same, capable of determining the position of a tire pressure sensor, that is, the position of a tire, by using a received signal strength indicator (RSSI) and a tire internal temperature variation, which are received from the tire pressure sensor, and a method for the same.

The technical problems to be solved by the present disclosure are not limited to the aforementioned problems, and other technical problems not mentioned herein will be clearly understood from the following description by those skilled in the art to which the present disclosure pertains.

According to an embodiment of the present disclosure, an apparatus for determining a tire position may include a receiver to receive a signal from at least one tire pressure sensor, a processor to determine the tire position, based on a tire internal temperature variation of a tire and a strength of the signal, which are received from the at least one tire pressure sensor, and a memory to store data and an algorithm run by the processor.

According to an embodiment, the processor may determine the tire position, based on a wheel pulse signal, and may determine the tire position, based on the tire internal temperature variation and the strength of the signal, when a wheel speed sensor providing the wheel pulse signal is failed or vehicle communication is failed.

According to an embodiment, the processor may determine whether one of a plurality of tires is a front wheel tire or a rear wheel tire, by comparing a tire internal temperature variation of the one of the plurality of tires with an average temperature variation of the plurality of tires.

According to an embodiment, the processor may determine a first tire of the plurality of tires as being the front wheel tire, when a tire internal temperature variation of the first tire is greater than the average temperature variation of the plurality of tires.

According to an embodiment, the processor may determine whether the first tire and a second tire of the plurality of tires are positioned in a first direction or a second direction opposite to the first direction by comparing strength of a signal received from a tire pressure sensor positioned at the first tire with strength of a signal received from a tire pressure sensor positioned at the second tire, when the first tire and the second tire are determined as being front wheel tires.

According to an embodiment, the processor may determine the first direction or the second direction, based on a position of the receiver inside a vehicle.

According to an embodiment, the processor may determine a first tire of the plurality of tires as being the rear wheel tire, when a tire internal temperature variation of the first tire is equal to or less than the average temperature variation of the plurality of tires.

According to an embodiment, the processor may determine whether the first tire and a second tire of the plurality of tires are positioned in a first direction or a second direction opposite to the first direction by comparing strength of a signal received from a tire pressure sensor positioned at the first tire with strength of a signal received from a tire pressure sensor positioned at the second tire, when the first tire and the second tire are determined as being rear wheel tires.

According to another embodiment of the present disclosure, a method for determining a tire position may include receiving a signal from at least one tire pressure sensor, and determining the tire position, based on a tire internal temperature variation and strength of the signal, which are received from the at least one tire pressure sensor.

According to an embodiment, the determining of the tire position may include determining whether a wheel speed sensor providing a wheel pulse signal is failed or vehicle communication is failed, and determining the tire position, based on the previous tire internal temperature variation and the strength of the signal, when the wheel speed sensor is failed or the vehicle communication is failed.

According to an embodiment, the determining of the tire position may include determining whether one of a plurality of tires is a front wheel tire or a rear wheel tire, by comparing a tire internal temperature variation of the one of the plurality of tires with an average temperature variation of the plurality of tires.

According to an embodiment, the determining of whether the one of the plurality of tires is the front wheel tire or the rear wheel tire may include determining a first tire of the plurality of tires as the front wheel tire, when a tire internal temperature variation of the first tire is greater than the average temperature variation of the plurality of tires.

According to an embodiment, the determining of the tire position may include determining whether the first tire and a second tire of the plurality of tires are positioned in a first direction or a second direction opposite to the first direction by comparing strength of a signal received from a tire pressure sensor positioned at the first tire with strength of a signal received from a tire pressure sensor positioned at the second tire, when the first tire and the second tire are determined as being front wheel tires.

According to an embodiment, the determining of whether the one of the plurality of tires is the front wheel tire or the rear wheel tire may include determining a first tire of the plurality of tires as the rear wheel tire, when a tire internal temperature variation of the first tire is equal to or less than the average temperature variation of the plurality of tires.

According to an embodiment, the determining of the tire position may include determining whether the first tire and a second tire of the plurality of tires are positioned in a first direction or a second direction opposite to the first direction by comparing strength of a signal received from a tire pressure sensor positioned at the first tire with strength of a signal received from a tire pressure sensor positioned at the second tire, when the first tire and the second tire are determined as being rear wheel tires.

According to an embodiment, the determining of the tire position may include determining the first direction or the second direction, based on a position of a receiver, which receives a signal from the tire pressure sensor, inside a vehicle.

BRIEF DESCRIPTION OF THE DRAWINGS

The above and other objects, features and advantages of embodiments of the present disclosure will be more apparent from the following detailed description taken in conjunction with the accompanying drawings, in which.

DETAILED DESCRIPTION OF ILLUSTRATIVE EMBODIMENTS

Figure 1:
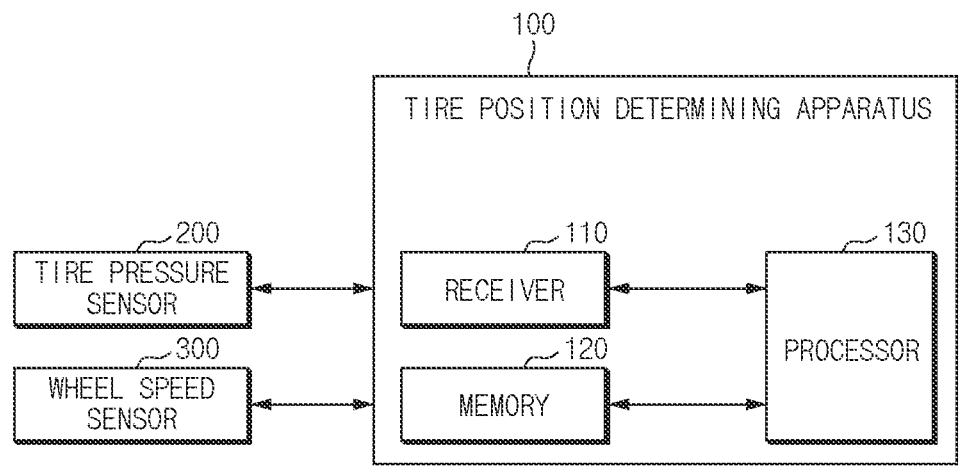
FIG. 1 is a block diagram illustrating a configuration of an apparatus for determining a tire position, according to an embodiment of the present disclosure.

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiments of the present disclosure, a detailed description of well-known features or functions will be omitted in order not to unnecessarily obscure the gist of the present disclosure.

In addition, in the following description of components according to embodiments of the present disclosure, the terms 'first', 'second', 'A', 'B', '(a)', and '(b)' may be used. These terms are merely intended to distinguish one component from another component, and the terms do not limit the nature, sequence or order of the constituent components. In addition, unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Hereinafter, embodiments of the present disclosure will be described with reference to FIGS. 1 to 7.

FIG. 1 is a block diagram illustrating a configuration of an apparatus for determining a tire position, according to an embodiment of the present disclosure.

Referring to FIG. 1, according to an embodiment of the present disclosure, a vehicle system may include a tire position determining apparatus 100 for determining a tire position, a tire pressure sensor (or a tire pressuring monitoring sensor: TPMS) 200, and a wheel speed sensor 300.

According to an embodiment of the present disclosure, the tire position determining apparatus 100 may be implemented inside the vehicle. In this case, the tire position determining apparatus 100 may be implemented integrally with internal control units of the vehicle. Alternatively, the tire position determining apparatus 100 may be implemented separately from the internal control units of the vehicle and may be connected with the internal control units of the vehicle through an additional connection unit.

The tire position determining apparatus 100 may determine a tire position, based on a tire internal temperature variation and a strength (RSSI) of a signal, which are received from the tire pressure sensor 200. In this case, the tire position may include positions of a right front wheel tire (FR), a left front wheel tire (FL), a right rear wheel tire (RR), and a left rear wheel tire (RL).

The tire position determining apparatus 100 may determine a position (FL, FR, RL, or RR) of a tire mounted with a tire pressure sensor by learning the position of the tire pressure sensor using wheel pulse information received from the wheel speed sensor 300.

However, the tire position determining apparatus 100 may not determine the tire position because the wheel pulse information is not received when the wheel speed sensor 300 is failed or vehicle communication is failed.

In this case, the tire position determining apparatus 100 may determine the sensor position mounted on each tire of the vehicle, by using the tire internal temperature variation and the strength (signal strength) of the signal from the tire pressure sensor 200. In this case, the tire position determining apparatus 100 may recognize the tire internal temperature variation of each tire, based on temperature information received from the tire pressure sensor 200 of each tire, and may determine whether the tire is at the right side or left side, based on the strength of the signal received from the tire pressure sensor 200 of each tire.

Referring to FIG. 1, the tire position determining apparatus 100 may include a receiver 110, a memory (i.e., storage) 120, and a processor 130.

Figure 4:
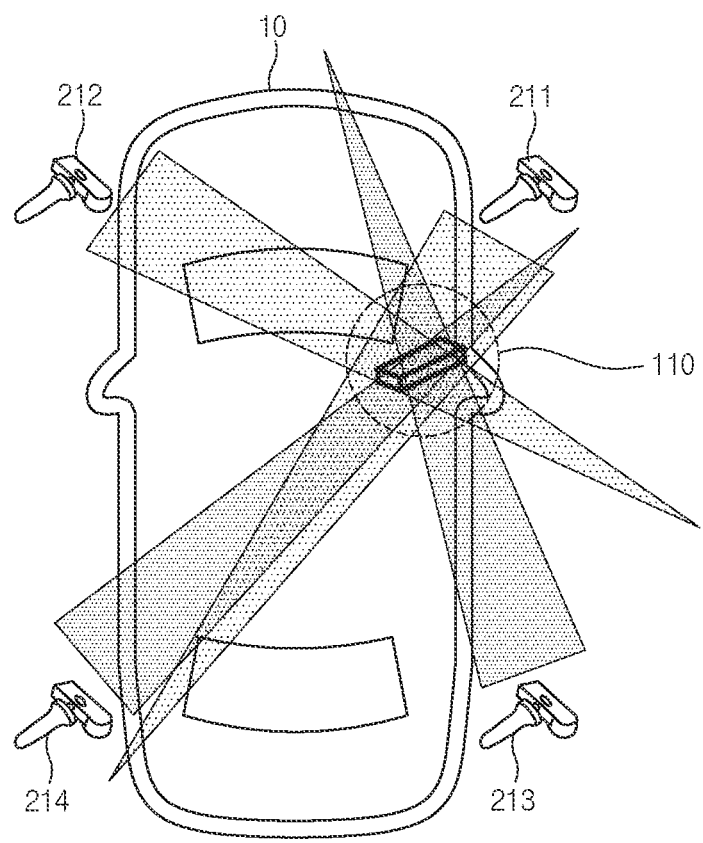
FIG. 4 is a view illustrating a manner of determining left and right tires, based on an RSSI received from a tire pressure sensor, according to an embodiment of the present disclosure.

The receiver 110 is a hardware device implemented with various electronic circuits to receive a signal through wireless connection. For example, the receiver 110 may receive a signal from the tire pressure sensor 200. In this case, the receiver no receives a radio frequency (RF) signal. The tire pressure sensor 200 may include four tire pressure sensors in total, and the four tire pressure sensors may be positioned at four tires in the vehicle, respectively. In addition, although FIG. 1 illustrates that the receiver no is integrally configured together with the memory 120 and the processor 130, in one module, only the receiver 110 may be separately mounted as illustrated in FIG. 4.

For example, the receiver no may be positioned at a right side surface or a left side surface of the vehicle.

The memory 120 may store data and/or algorithms required for the processor 130 to operate.

For example, the memory 120 may store the strength of the signal received from the tire pressure sensor 200 and a learning algorithm for determining the tire position.

In addition, the memory 120 may include at least one storage medium of a memory in a flash memory type, a hard disk type, a micro type, the type of a card (e.g., a Security Digital (SD) card or an eXtreme digital card), a Random Access Memory (RAM), a Static RAM (SRAM), a Read Only Memory (ROM), a Programmable ROM (PROM), an Electrically Erasable and Programmable ROM (EEPROM), a magnetic RAM (MRAM), a magnetic disk-type memory, or an optical disk-type memory.

The processor 130 may be electrically connected with the receiver no and the memory 120, and the like, may electrically control each component, and may be an electric circuit that executes software commands. Accordingly, the processor 130 may perform various data processing and calculation, to be described below.

The processor 140 may process a signal transmitted between components of the tire position determining apparatus 100. The processor 130 may be, for example, an electronic control unit (ECU), a micro controller unit (MCU), or another lower-level controller mounted in the vehicle.

The processor 130 may display, on a driver display window, a tire low-temperature warning and air-pressure information for each tire, by using tire pressure information and temperature information, which are received from the tire pressure sensor 200. In this case, the driver display window may be implemented with a head up display (HUD), a cluster, an audio video navigation (AVN), a human machine interface (HMI), or a user select menu (USM).

The processor 130 learns a sensor position by using wheel pulse information received from the wheel speed sensor 300. In this case, the processor 130 may learn positions of tire pressure sensors 211, 212, 213, and 214 by using all pieces of wheel pulse information received from four wheel speed sensors.

The processor 130 may determine each tire position, based on the wheel pulse signal. In this case, the processor 130 may determine the tire position, based on the tire internal temperature variation and the strength of the signal, when the wheel speed sensor 300 providing the wheel pulse signal is failed or vehicle communication is failed.

In other words, the processor 130 may monitor whether at least one of four wheel speed sensors is failed or CAN communication of the vehicle is failed, and may determine positions of the tire pressure sensors 211, 212, 213, and 214, based on the tire internal temperature variations and the strength of signals received from the tire pressure sensors 211, 212, 213, and 214, when at least one of four wheel speed sensors is failed or CAN communication of the vehicle is failed.

The processor 130 may determine whether one of a plurality of tires is a front wheel tire or a rear wheel tire, by comparing a tire internal temperature variation of the one of the plurality of tires with an average temperature variation of the plurality of tires.

Figure 2:
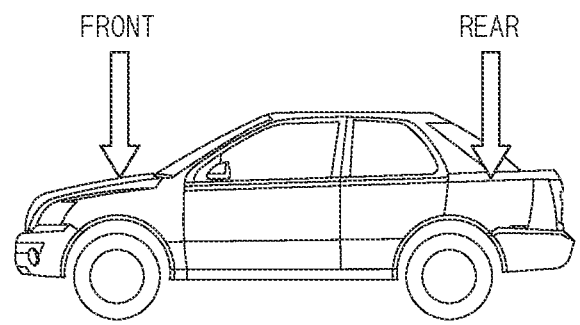
FIG. 2 is a view illustrating a screen displaying a tire position of a vehicle, according to an embodiment of the present disclosure.

In other words, when the tire pressure sensor measures the internal temperature of the tire and transmits the internal temperature of the tire to the receiver no through radio frequency (RF) communication, the processor 130 determines the tire position by using information on a tire internal temperature received by the receiver no. In this case, the processor 130 may distinguish between the front wheel tire and the wheel rear tire, as illustrated in FIG. 2, by using that the internal temperature of a tire mounted on the front wheel (front wheel drive) having a heavy load, and serving as a driving wheel in vehicle driving, is more rapidly increased than an internal temperature of a tire mounted on a rear wheel. FIG. 2 is a view illustrating a screen displaying a tire position of a vehicle, according to an embodiment of the present disclosure.

The processor 130 may determine a first tire of the plurality of tires as being the front wheel tire, when a tire internal temperature variation of the first tire is greater than the average temperature variation of the plurality of tires, and determine the first tire as the rear wheel tire, when the tire internal temperature variation of the first tire is equal to or less than the average temperature variation of the plurality of tires.

Figure 3:
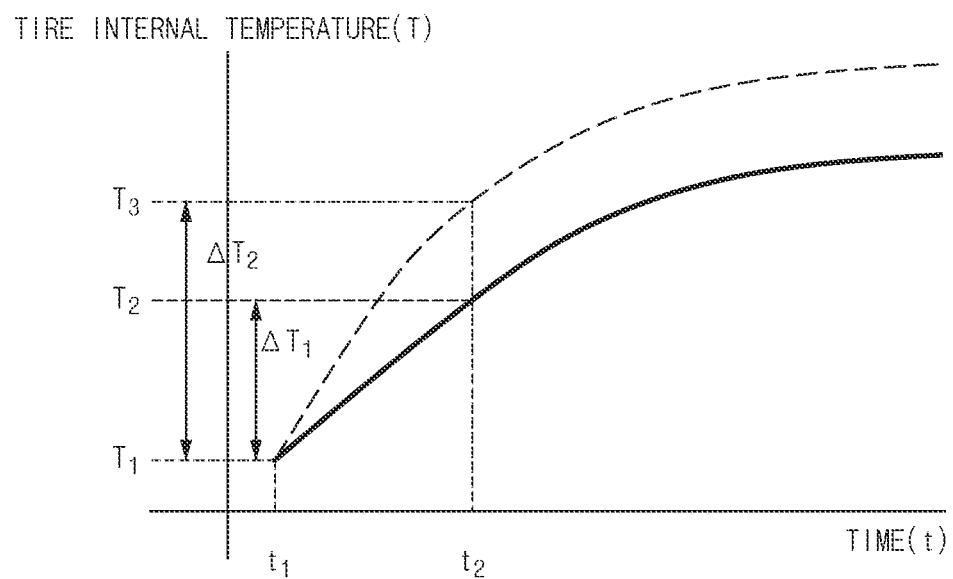
FIG. 3 is a graph illustrating a tire internal temperature variation for each tire position, according to an embodiment of the present disclosure.

FIG. 3 is a graph illustrating a tire internal temperature variation for each tire position, according to an embodiment of the present disclosure. Referring to FIG. 3, tire internal temperatures ($T_2$ and $T_3$) are increased from an initial temperature $T_1$, as specific times ($t_1$ and $t_2$) are elapsed from a starting time point of autonomous driving. In this case, the specific time may be set to a time after 20-min driving. In this case, a temperature increment is higher in an internal temperature ($T_3$) of a front wheel tire which has a heavier load and serves as a driving axis, as compared to an internal temperature ($T_2$) of a rear wheel tire which serves as a driven axis.

Accordingly, the processor 130 may determine whether the relevant tire is a front wheel tire or a rear wheel tire, by using a tire internal temperature variation of each tire.

On the assumption that the average value of the temperature variations of four tires in a vehicle is $\Delta T_{mean}$, when the temperature variations of two tires are greater than the average value ($\Delta T_{mean}$) of the temperature variations, the processor 130 may distinguish between front wheels and rear wheels.

Front wheel: $(\Delta T_{1st}, \Delta T_{2nd}) > \Delta T_{mean}$,

Rear wheel: $(\Delta T_{3rd}, \Delta T_{4th}) <= \Delta T_{mean}$  Equation 1

Regarding Equation 1, since the temperature variation ($\Delta T_{1st}$) of the first tire and the temperature variation ($\Delta T_{2nd}$) of the second tire are greater than the average value ($\Delta T_{mean}$) of the temperature variations, the first tire and the second tire may be determined as front wheels. In addition, since the temperature variation ($\Delta T_{3rd}$) of the third tire and the temperature variation ($\Delta T_{4th}$) of the fourth tire are equal to or less than the average value ($\Delta T_{mean}$) of the temperature variation, the third tire and the fourth tire may be determined as rear wheels.

TABLE 1

| Driving state | Vehicle wheel | | | |
| --- | --- | --- | --- | --- |
|  | FL | FR | RL | RR |
| Temperature (° C.) before driving | 23 | 22 | 23 | 24 |
| Temperature (° C.) after driving | 28 | 26 | 24 | 24 |
| Temperature variation (° C.) | 5 | 4 | 1 | 0 |

Table 1 shows the tire internal temperature variation when the vehicle is driven for a specific time. It may be recognized that the internal temperature of the front wheel is increased to be higher than the internal temperature of the rear wheel.

The processor 130 may determine whether a first tire and a second tire are positioned in a first direction or a second direction opposite to the first direction by comparing strength of a signal received from a tire pressure sensor positioned at the first tire with strength of a signal received from a tire pressure sensor at the second tire, when the first tire and the second tire are determined as being front wheel tires.

The processor 130 may determine whether the first tire and the second tire are positioned in a first direction or a second direction opposite to the first direction by comparing the strength of the signal received from the tire pressure sensor positioned at the first tire with the strength of the signal received from the tire pressure sensor at the second tire, when the first tire and the second tire are determined as being rear wheel tires.

The tire pressure sensor 200 transmits measured values, such as tire internal pressure and a tire internal temperature, to the receiver no through the RF communication. The numeric value of an RF signal strength received in the receiver no from the tire pressure sensor is an RSSI value, and the distance difference between the tire pressure sensor 200 and the receiver no may be determined by using the absolute numeric value of the RSSI value. In other words, a greater RSSI value may be measured in the shorter distance between the tire pressure sensor 200 and the receiver no rather than the longer distance between the tire pressure sensor 200 and the receiver no. FIG. 4 is a view illustrating a manner of determining left and right tires, based on strength of a signal received from a tire pressure sensor, according to an embodiment of the present disclosure.

Accordingly, when the receiver no is positioned to be offset to the left side or the right side of the vehicle 10, the distances between the tire pressure sensor 200 and the receiver no is changed. Accordingly, the strength of the signal received from each tire pressure sensor 200 is changed.

Accordingly, the processor 130 may determine whether the relevant tire pressure sensor is positioned at the left wheel or at the right wheel, based on the strength of the signal received in the receiver no from each tire pressure sensor.

For example, as illustrated in FIG. 4, when the receiver no is offset to the right side of the vehicle, the longest distance is made between the receiver no and the tire pressure sensor 214 at the left side of the rear wheel, and the shortest distance is made between the receiver 110 and the tire pressure sensor 213 at the right side of the rear wheel. Accordingly, the strength of the signal received from the tire pressure sensor 214 at the left side of the rear wheel is weaker than the strength of the signal of a signal received from the tire pressure sensor 213 at the right side of the rear wheel.

Figure 5:
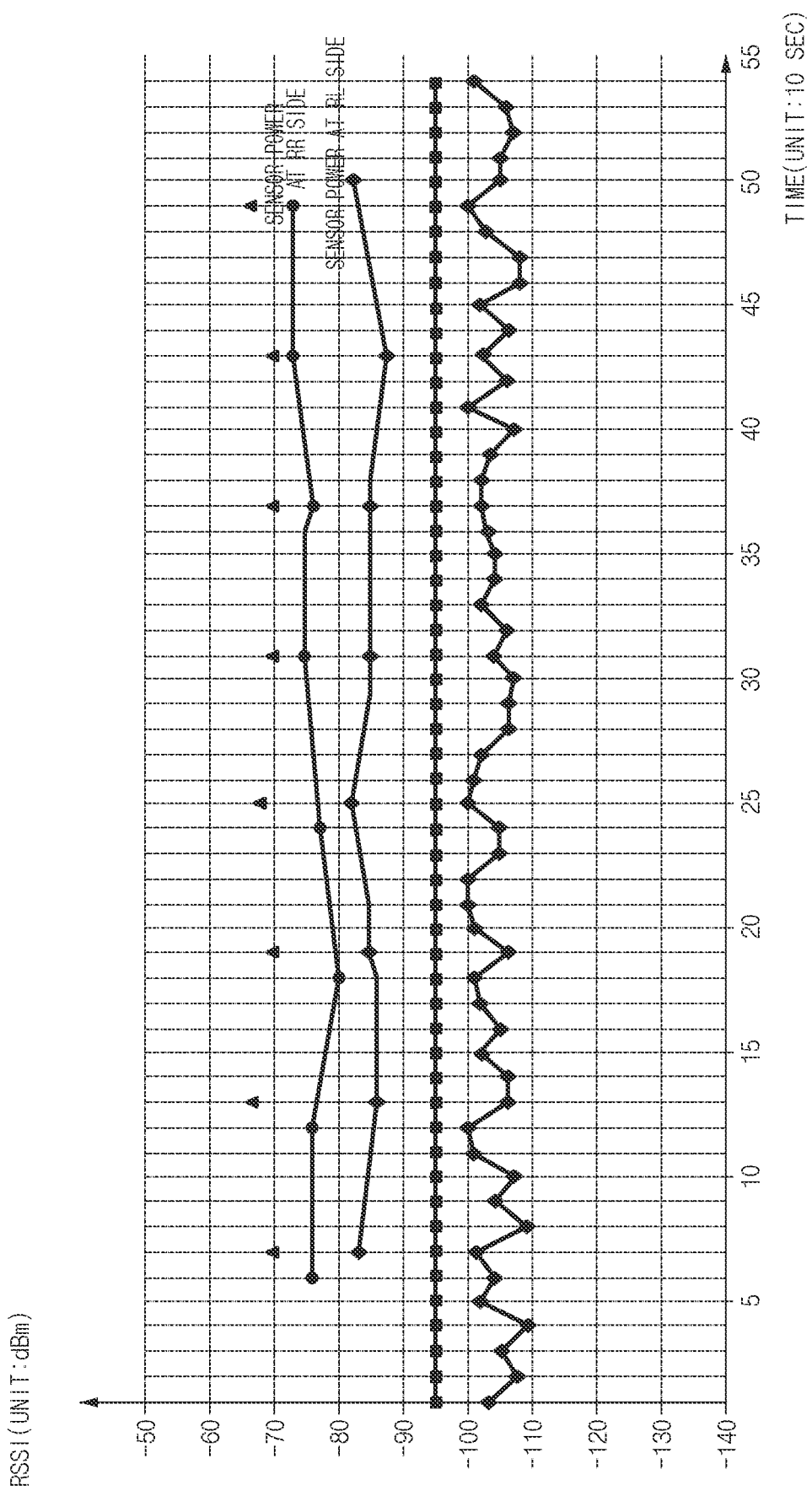
FIG. 5 is a view illustrating an RSSI from a tire pressure sensor, according to an embodiment of the present disclosure.

FIG. 5 is a view illustrating strength of a signal from a tire pressure sensor, according to an embodiment of the present disclosure. Referring to FIG. 5, it may be recognized that the strength of the signal from the tire pressure sensor at the right side (RR) of the rear wheel is greater than the strength of the signal from the tire pressure sensor at the left side (RL) of the rear wheel.

The processor 130 may determine the first direction or the second direction, depending on the position of the receiver no in the vehicle. For example, when the receiver 110 is mounted at the right side of the vehicle, the tire pressure sensor at the right side of the vehicle is closer to the receiver no in distance. Accordingly, the strength of the signal received from the tire pressure sensor at the right side becomes greater than the strength of the signal received from the tire pressure sensor at the left side. Accordingly, the processor 130 may determine the tire pressure sensor having the greater signal strength as being positioned at the right side (in the first direction), and may determine the tire pressure sensor having the lesser signal strength as being positioned at the left side (in the second direction).

The tire pressure sensor 200 may be mounted on the front wheel and the rear wheel of the vehicle, as illustrated in FIG. 4, to check air pressure of the front wheel and air pressure of the rear wheel.

The tire pressure sensor 200 may include four tire pressure sensors 211, 212, 213, and 214, as illustrated in FIG. 4.

The tire pressure sensor 200 may sense pressure and a temperature of each of the four tires and may transmit the sensing result to the tire position determining apparatus 100.

The wheel speed sensor 300 may provide wheel pulse information resulting from the movement of a vehicle wheel, to the tire position determining apparatus 100. To this end, the wheel speed sensor 300 may be mounted on each of four wheels.

Figure 6:
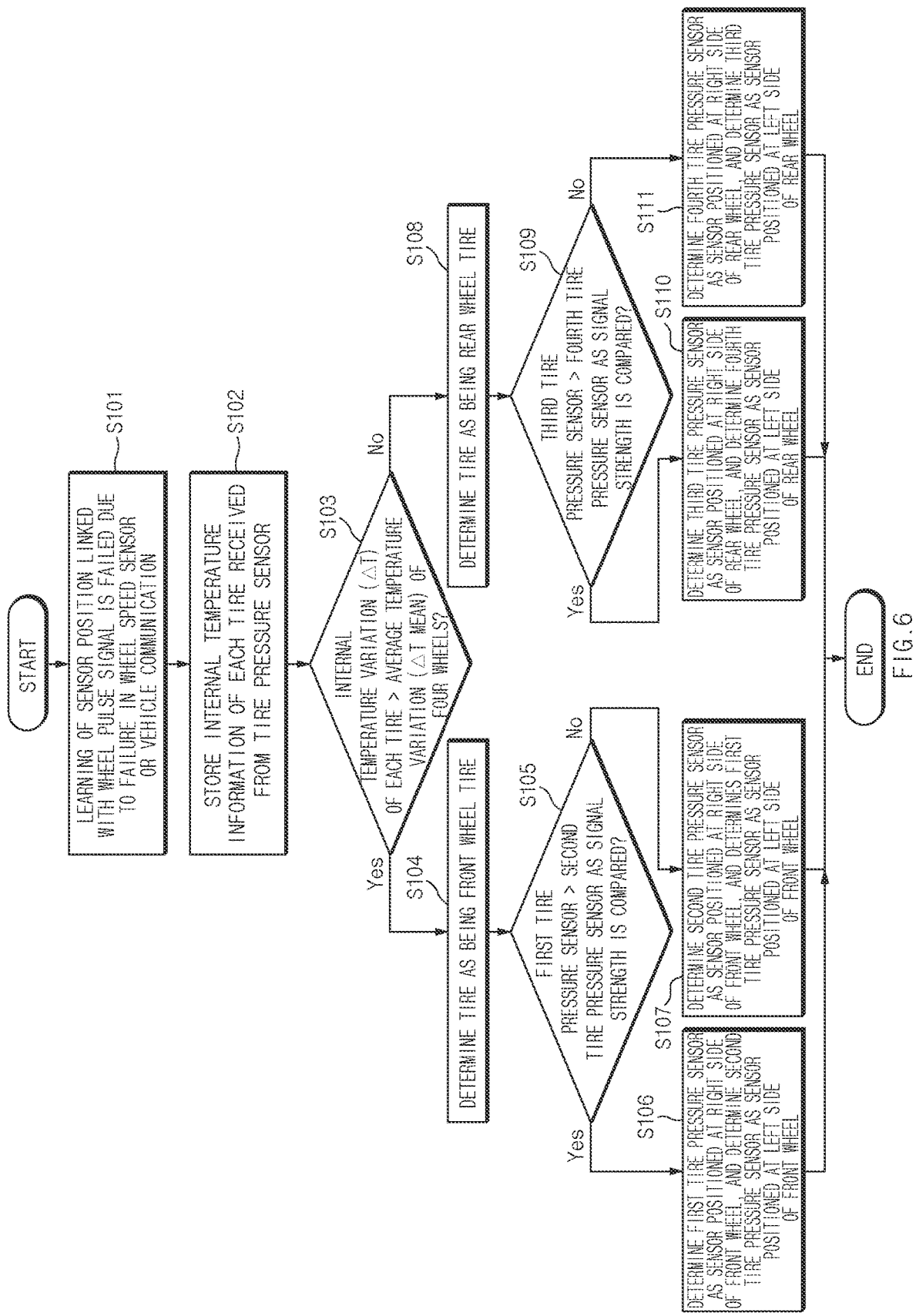
FIG. 6 is a flowchart illustrating a method for determining a tire position, according to an embodiment of the present disclosure.

Hereinafter, a method for determining a position of a tire will be described in more detail with reference to FIG. 6, according to an embodiment of the present disclosure. FIG. 6 is a flowchart illustrating the method for determining the position of the tire according to an embodiment of the present disclosure. The following description will be made with reference to FIG. 6 on the assumption that the receiver 110 is mounted at the right side of the vehicle as illustrated in FIG. 4.

Hereinafter, it is assumed that the tire position determining apparatus 100 of FIG. 1 performs the process of FIG. 6. In addition, in the description made with reference to FIG. 6, it may be understood that operations described as being performed by an apparatus are controlled by the processor 130 of the tire position determining apparatus 100.

Referring to FIG. 6, the tire position determining apparatus 100 learns the wheel speed sensor 300 is failed or vehicle communication is failed (S101), and stores internal temperature information of each tire received from the tire pressure sensor 200 (S102) upon learning the sensor position linked with the wheel pulse signal is failed due to the failure in the wheel speed sensor 300 or the vehicle communication (S101).

The tire position determining apparatus 100 compares an internal temperature variation of each of the tires with an average temperature variation of four wheels (S103).

The tire position determining apparatus 100 determines the tire as a front wheel tire, when the internal temperature variation of the tire is greater than the average temperature variation of the four wheels (S104).

In other words, when the vehicle is driven, the tire internal temperature of the front wheel (front wheel drive) having the heavier load and serving as the driving wheel is more rapidly increased than the tire internal temperature of the rear wheel. Accordingly, the tire position determining apparatus 100 may determine whether the tire is the front wheel tire or the rear wheel tire, based on the tire internal temperature variation.

The following description will be made regarding a manner that the tire position determining apparatus 100 determines whether the tire is a right tire or a left tire, based on the strength (RSSI) of a signal received from the tire pressure sensor 200.

When the tire is determined as the front wheel tire as in S104, the tire position determining apparatus 100 compares strengths (RSSI) of two signals received from two tire pressure sensors of the front wheel tires (S105).

In other words, the tire position determining apparatus wo receives RF signals from a first tire pressure sensor and a second tire pressure sensor positioned at the right tire and the left tire of the front wheels. When the signal strength from the first tire pressure sensor is greater than the signal strength from the second tire pressure sensor, as the tire position determining apparatus 100 compares the strengths of the received two signals, the tire position determining apparatus 100 determines the first tire pressure sensor as the sensor positioned at the right side of the front wheel, and determines the second tire pressure sensor as the sensor positioned at the left side of the front wheel (S106).

Meanwhile, when the signal strength from the first tire pressure sensor is not greater than the signal strength from the second tire pressure sensor, the tire position determining apparatus 100 determines the second tire pressure sensor as the sensor positioned at the right side of the front wheel, and determines the first tire pressure sensor as the sensor positioned at the left side of the front wheel (S107).

Meanwhile, when the tire internal temperature variation is equal to or less than the average temperature variation of the four wheels in S103, the tire is determined as being the rear wheel tire (S108).

Thereafter, the tire position determining apparatus 100 compares strengths of two signals received from the two tire pressure sensors at the rear wheel tires (S109).

In other words, the tire position determining apparatus 100 receives RF signals from a third tire pressure sensor and a fourth tire pressure sensor positioned a right side and a left side of the rear wheel, respectively. When the signal strength from the third tire pressure sensor is greater than the signal strength from the fourth tire pressure sensor, as the tire position determining apparatus 100 compares the strengths of the received two signals, the tire position determining apparatus 100 determines the third tire pressure sensor as the sensor positioned at the right side of the rear wheel, and determines the fourth tire pressure sensor as the sensor positioned at the left side of the rear wheel (S110).

Meanwhile, when the signal strength from the third tire pressure sensor is not greater than the signal strength from the fourth tire pressure sensor, the tire position determining apparatus 100 determines the fourth tire pressure sensor as the sensor positioned at the right side of the rear wheel, and determines the third tire pressure sensor as the sensor positioned at the left side of the rear wheel (S111).

As described above, embodiments of the present disclosure relate to learning of a tire position in a tire pressure sensor (TPMS) system, in which the position of the tire pressure sensor mounted in the vehicle may be determined by using the RSSI value from the tire pressure sensor (TPMS) and the tire internal temperature variation.

In other words, according to embodiments of the present disclosure, RF signals are received through the receiver from the tire pressure sensors mounted on four wheels in the vehicle, and the mounting position of each tire pressure sensor may be determined by using the temperature variation and the RSSI value of the sensor RF signal. In detail, whether the tire is the front wheel tire or the rear wheel tire is first determined by using the tire internal temperature variation of each tire. In other words, according to embodiments of the present disclosure, when the difference in the temperature variation is made by a specific value or more, two tires representing a larger increment may be determined as front wheel tires, and two tires representing a smaller increment may be determined as rear wheel tires.

According to embodiments of the present disclosure, strengths of signals from two tire pressure sensors of two tires on front wheels are compared with each other and whether each of the tires is at the right side or left side. Similarly, strengths of signals from two tire pressure sensors of two tires on rear wheels are compared with each other and whether each of the tires is at the right side or left side.

As described above, according to embodiments of the present disclosure, the front wheel/rear wheel is distinguished, based on the tire internal temperature variation, and the right side/left side is distinguished by utilizing the RSSI value of the tire pressure sensor, such that the positions of the sensors on vehicle wheels, that is, FL, FR, RL, and RR are exactly determined.

Conventionally, additional logic necessary to learn the sensor position has been provided by a wheel speed sensor vendor. Accordingly, logic for diagnosing the failure of the TPMS/determining low-pressure has been developed by a platform vendor, and a function of learning the sensor position has been developed by the sensor vendor. Accordingly, the sensor vendors provide different position learning logic. However, according to embodiments of the present disclosure, logic development may be unified by determining a tire position based on a tire internal temperature without information on the wheel speed sensor.

In addition, since the position learning logic provided by the sensor vendor is often influenced by the wheel sensor and CAN communication, the learning is not made in the vehicle frequently (e.g., the fault in setting ABS/ESC specifications, an IBU wheel pulse input error, or CAN communication failure), such that the learning for the sensor position is not sufficiently made. However, according to embodiments of the present disclosure, since the sensor position learning is performed only by using the signal from the tire pressure sensor, the sensor position learning is not influenced by another controller or another communication line, so the probability of the failure in sensor position learning is decreased.

Figure 7:
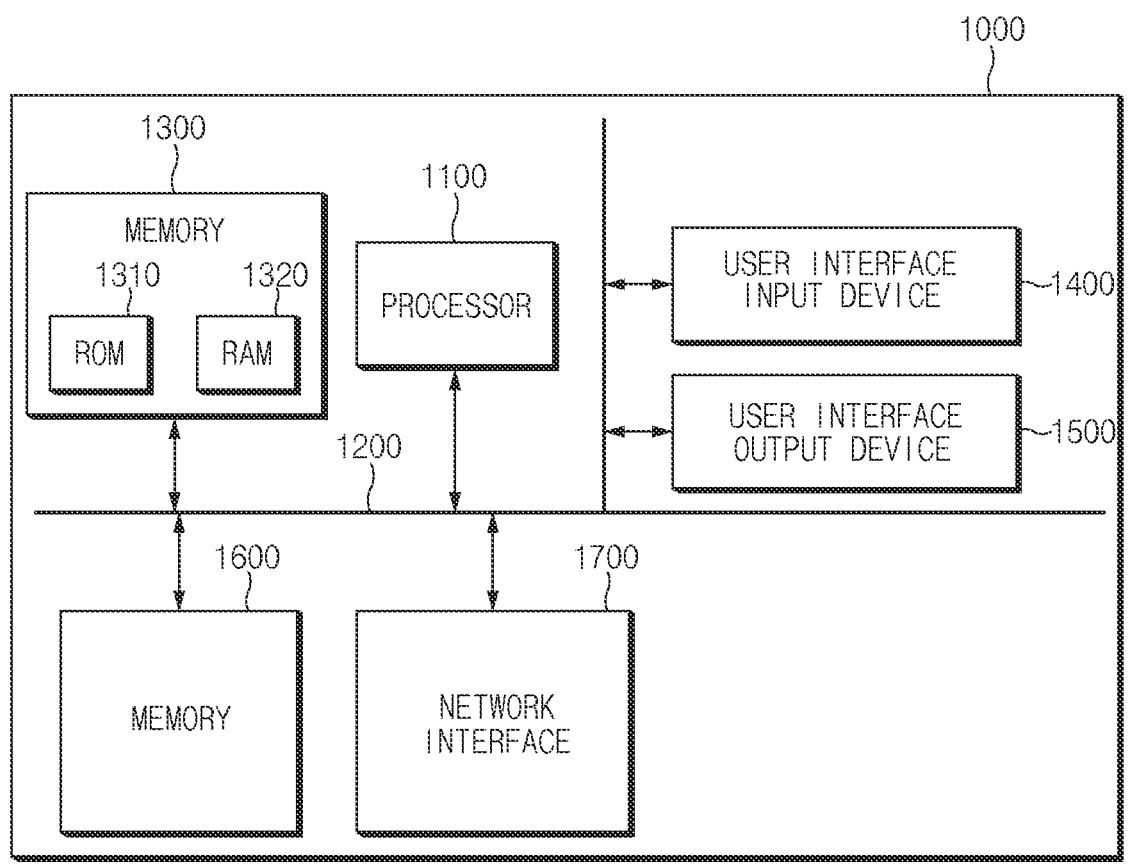
FIG. 7 illustrates a computing system, according to an embodiment of the present disclosure.

FIG. 7 illustrates a computing system, according to an embodiment of the present disclosure.

Referring to FIG. 7, a computing system 1000 may include at least one processor 1100, a memory 1300, a user interface input device 1400, a user interface output device 1500, a memory (i.e., storage) 1600, and a network interface 1700, which are connected with each other via a bus 1200.

The processor 1100 may be a central processing unit (CPU) or a semiconductor device for processing instructions stored in the memory 1300 and/or the memory 1600. Each of the memory 1300 and the memory 1600 may include various types of volatile or non-volatile storage media. For example, the memory 1300 may include a read only ROM 1310 and a RAM 1320.

Thus, the operations of the methods or algorithms described in connection with the embodiments disclosed in the present disclosure may be directly implemented with a hardware module, a software module, or the combinations thereof, executed by the processor 1100. The software module may reside on a storage medium (i.e., the memory 1300 and/or the memory 1600), such as a RAM, a flash memory, a ROM, an erasable and programmable ROM (EPROM), an electrically EPROM (EEPROM), a register, a hard disc, a removable disc, or a compact disc-ROM (CD-ROM).

The exemplary storage medium may be coupled to the processor 1100. The processor 1100 may read out information from the storage medium and may write information in the storage medium. Alternatively, the storage medium may be integrated with the processor 1100. The processor and storage medium may reside in an application specific integrated circuit (ASIC). The ASIC may reside in a user terminal. Alternatively, the processor and storage medium may reside as separate components of the user terminal.

According to embodiments of the present disclosure, the position of the tire pressure sensor mounted on the tire of the vehicle may be determined by using the signal strength (RSSI) of and the tire internal temperature variation from the tire pressure sensor (TPS).

Besides, a variety of effects directly or indirectly understood through the disclosure may be provided.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, the exemplary embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

What is claimed is:

1. An apparatus for determining a tire position, the apparatus comprising:
   a receiver configured to receive a signal from a tire pressure sensor of a vehicle;
   a processor configured to:
      determine, while the vehicle is driven, the tire position based on a wheel pulse signal when a wheel speed sensor configured to provide the wheel pulse signal and vehicle communication are operational; and
      determine, while the vehicle is driven, the tire position based on a tire internal temperature variation of a tire and a strength of the signal received from the tire pressure sensor when the wheel speed sensor configured to provide the wheel pulse signal is failed or the vehicle communication is failed; and
   memory configured to store data and an algorithm executable by the processor.

2. The apparatus of claim 1, wherein the processor is further configured to determine whether one of a plurality of tires is a front wheel tire or a rear wheel tire, by comparing the tire internal temperature variation of the one of the plurality of tires with an average temperature variation of the plurality of tires.

3. The apparatus of claim 2, wherein the processor is further configured to determine a first tire of the plurality of tires as the front wheel tire based on the tire internal temperature variation of the first tire being greater than the average temperature variation of the plurality of tires.

4. The apparatus of claim 3, wherein the processor is further configured to determine whether the first tire and a second tire of the plurality of tires are positioned in a first direction or a second direction opposite to the first direction by comparing a strength of the signal received from the tire pressure sensor positioned at the first tire with a strength of the signal received from the tire pressure sensor positioned at the second tire, when the first tire and the second tire are determined as front wheel tires.

5. The apparatus of claim 4, wherein the processor is further configured to determine the first direction or the second direction based on a position of the receiver inside a vehicle.

6. The apparatus of claim 2, wherein the processor is further configured to determine a first tire of the plurality of tires as being the rear wheel tire based on the tire internal temperature variation of the first tire being equal to or less than the average temperature variation of the plurality of tires.

7. The apparatus of claim 6, wherein the processor is further configured to determine whether the first tire and a second tire of the plurality of tires are positioned in a first direction or a second direction opposite to the first direction by comparing a strength of the signal received from the tire pressure sensor positioned at the first tire with a strength of the signal received from the tire pressure sensor positioned at the second tire, when the first tire and the second tire are determined as rear wheel tires.

8. A method for determining a tire position, the method comprising:
   receiving a signal from a tire pressure sensor of a vehicle; and
   determining, while the vehicle is driven, the tire position based on a tire internal temperature variation and a strength of the signal received from the tire pressure sensor,
   wherein determining the tire position comprises:
      determining that a wheel speed sensor providing a wheel pulse signal is failed or vehicle communication is failed; and
      determining the tire position based on the tire internal temperature variation and the strength of the signal as a result of the wheel speed sensor being failed or the vehicle communication being failed.

9. The method of claim 8, wherein determining the tire position comprises determining whether one of a plurality of tires is a front wheel tire or a rear wheel tire by comparing the tire internal temperature variation of the one of the plurality of tires with an average temperature variation of the plurality of tires.

10. The method of claim 9, wherein determining whether the one of the plurality of tires is the front wheel tire or the rear wheel tire comprises determining a first tire of the plurality of tires as the front wheel tire based on the tire internal temperature variation of the first tire being greater than the average temperature variation of the plurality of tires.

11. The method of claim 10, wherein determining the tire position comprises determining whether the first tire and a second tire of the plurality of tires are positioned in a first direction or a second direction opposite to the first direction by comparing a strength of the signal received from the tire pressure sensor positioned at the first tire with a strength of the signal received from the tire pressure sensor positioned at the second tire, when the first tire and the second tire are front wheel tires.

12. The method of claim 9, wherein determining whether the one of the plurality of tires is the front wheel tire or the rear wheel tire comprises determining a first tire of the plurality of tires as the rear wheel tire based on the tire internal temperature variation of the first tire being equal to or less than the average temperature variation of the plurality of tires.

13. The method of claim 12, wherein determining the tire position comprises determining whether the first tire and a second tire of the plurality of tires are positioned in a first direction or a second direction opposite to the first direction by comparing a strength of the signal received from the tire pressure sensor positioned at the first tire with a strength of the signal received from the tire pressure sensor positioned at the second tire, when the first tire and the second tire are rear wheel tires.

14. The method of claim 13, wherein determining the tire position comprises determining the first direction or the second direction based on a position of a receiver inside a vehicle, the receiver receiving the signals from the tire pressure sensors.

15. The method of claim 8, further comprising measuring a tire pressure using the tire pressure sensor, the signal being based on the measured tire pressure.

16. A vehicle comprising:
   a plurality of tires;
   a plurality of tire pressure sensors, wherein each of the plurality of tire pressure sensors is positioned at a respective one of the plurality of tires;
   a wheel speed sensor configured to provide a wheel pulse signal;
   a receiver configured to receive a signal from each of the plurality of tire pressure sensors; and
   a processor configured to:
      determine, while the vehicle is driven, a tire position of each of the plurality of tires based on the wheel pulse signal when the wheel speed sensor and vehicle communication are operational; and
      determine, while the vehicle is driven, the tire position of each of the plurality of tires based on a tire internal temperature variation of the tire and a strength of the signal received from the tire pressure sensor when the wheel speed sensor configured to provide the wheel pulse signal is failed or the vehicle communication is failed.

17. The vehicle of claim 16, wherein the processor is further configured to determine whether each of the plurality of tires is a front wheel tire or a rear wheel tire by comparing the tire internal temperature variation of each of the plurality of tires with an average temperature variation of the plurality of tires.

18. The vehicle of claim 17, wherein the processor is further configured to:
   determine a first tire of the plurality of tires is the front wheel tire based on the tire internal temperature variation of the first tire being greater than the average temperature variation of the plurality of tires;
   determine a second tire of the plurality of tires is the front wheel tire based on the tire internal temperature variation of the second tire being greater than the average temperature variation of the plurality of tires; and
   determine whether the first tire and the second tire of the plurality of tires are positioned in a first direction or a second direction opposite to the first direction by comparing a strength of the signal received from a first tire pressure sensor of the tire pressure sensors positioned at the first tire with a strength of the signal received from a second tire pressure sensor of the tire pressure sensors positioned at the second tire.

19. The vehicle of claim 17, wherein the processor is further configured to:
   determine a first tire of the plurality of tires is the rear wheel tire based on the tire internal temperature variation of the first tire being equal to or less than the average temperature variation of the plurality of tires;
   determine a second tire of the plurality of tires is the rear wheel tire based on the tire internal temperature variation of the second tire being equal to or less than the average temperature variation of the plurality of tires; and
   determine whether the first tire and the second tire of the plurality of tires are positioned in a first direction or a second direction opposite to the first direction by comparing a strength of the signal received from a first tire pressure sensor of the tire pressure sensors positioned at the first tire with a strength of the signal received from a second tire pressure sensor of the tire pressure sensors positioned at the second tire.

* * * * *